United States Patent [19]
Burkhalter

[11] Patent Number: 5,927,319
[45] Date of Patent: Jul. 27, 1999

[54] PIG LAUNCHER/RECEIVER

[76] Inventor: Richard Lee Burkhalter, 1155 Dune Meadow Dr., Porter, Ind. 46304-1287

[21] Appl. No.: 08/946,192

[22] Filed: Oct. 7, 1997

[51] Int. Cl.[6] ....................................................... B08B 9/04
[52] U.S. Cl. ...................... 137/268; 251/148; 15/104.061
[58] Field of Search ........................ 137/268; 15/104.05, 15/104.061, 104.062; 251/148

[56] References Cited

U.S. PATENT DOCUMENTS

| | | | |
|---|---|---|---|
| 3,081,472 | 3/1963 | Van Dijk | 15/104.062 |
| 3,175,240 | 3/1965 | Hillard | 15/104.061 |
| 3,543,324 | 12/1970 | Knapp et al. | 15/104.061 X |
| 3,545,540 | 12/1970 | Waldron | 15/104.061 X |
| 4,073,303 | 2/1978 | Foley, Jr. . | |
| 4,077,435 | 3/1978 | Van Scoy . | |
| 4,237,936 | 12/1980 | Lollis et al. . | |
| 5,339,846 | 8/1994 | Shelton et al. . | |
| 5,355,908 | 10/1994 | Berger et al. . | |
| 5,524,675 | 6/1996 | Berger . | |

*Primary Examiner*—Kevin Lee
*Attorney, Agent, or Firm*—Domenica N.S. Hartman; Gary M. Hartman

[57] ABSTRACT

A pig launcher/receiver (10) having a quick-coupling action when being secured or removed from a pipeline or similar conduit. The pig launcher/receiver (10) generally includes first and second fittings (24, 26) that are coaxially aligned with each other, and sealing elements (32, 34) for sealing abutting axial ends of the first and second fittings (24, 26). The first fitting (24) has male threads on an exterior surface thereof. The end of the second fitting (26) opposite the first fitting (24) is closed, thereby forming a cavity (52) within which at least a portion of a pig (20) can be received. The closed end of the second fitting (26) includes an inlet/outlet (50) for venting the cavity (52) between the pig (20) and the closed end, thereby enabling the pig (20) to be more fully received within the cavity (52). The pig launcher/receiver (10) further includes a sleeve member (28) circumscribing the second fitting (26) and threadably engaged with the male threads of the first fitting (24). The sleeve member (28) and second fitting (26) are preferably configured and equipped such that fluid pressure must be released from the pipeline before the sleeve member (28) can be unthreaded from the first fitting (24). Optional features of the launcher/receiver (10) include a device (22) for retaining a pig (20) in the launcher/receiver (10), and a passage (18) intersecting the first fitting (24) to allow bypassing of fluid past the launcher/receiver (10) when a pig (20) is received therein.

20 Claims, 1 Drawing Sheet

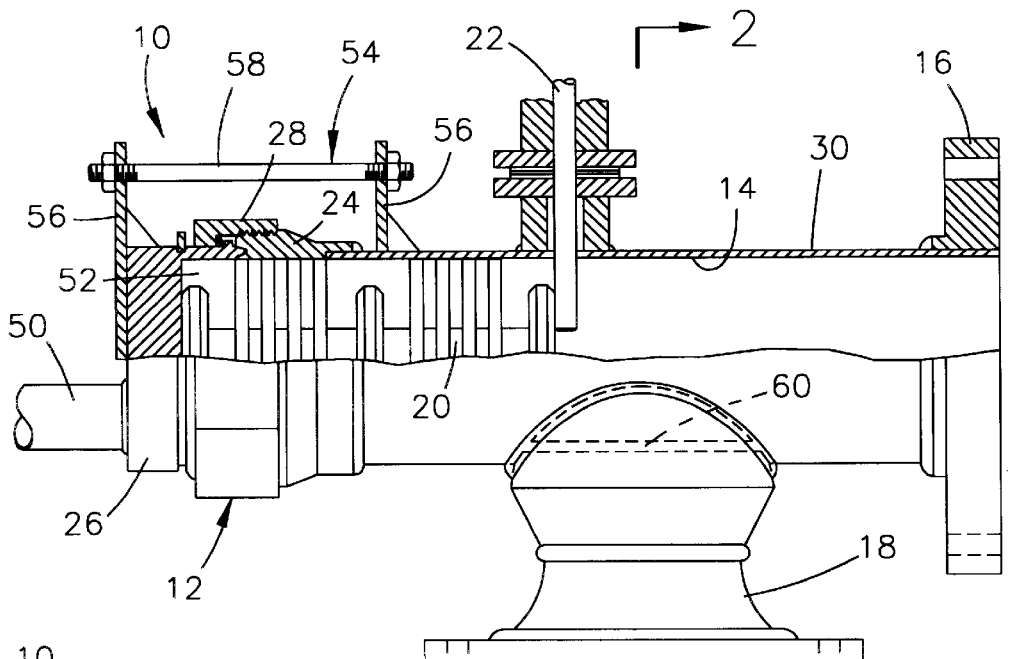
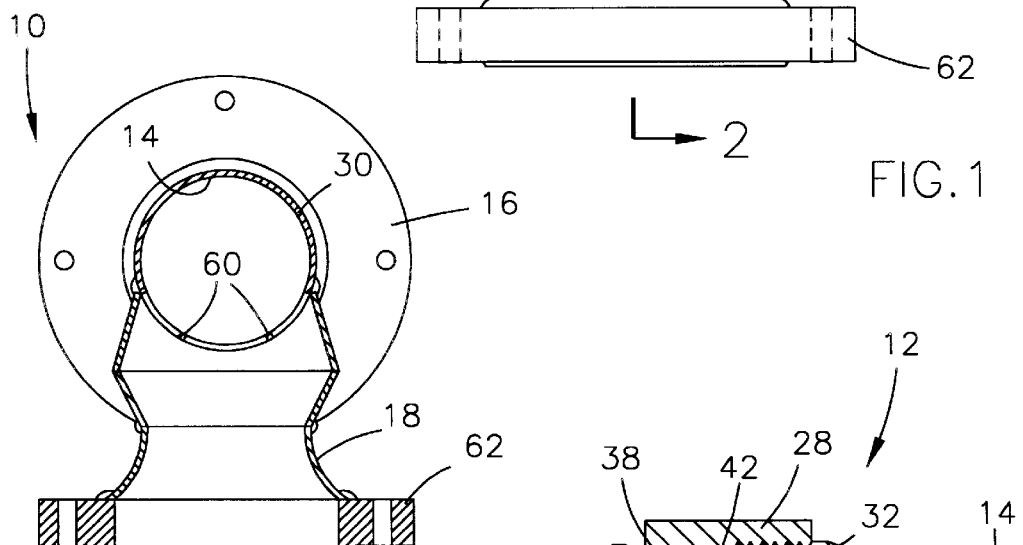
FIG. 1
FIG. 2
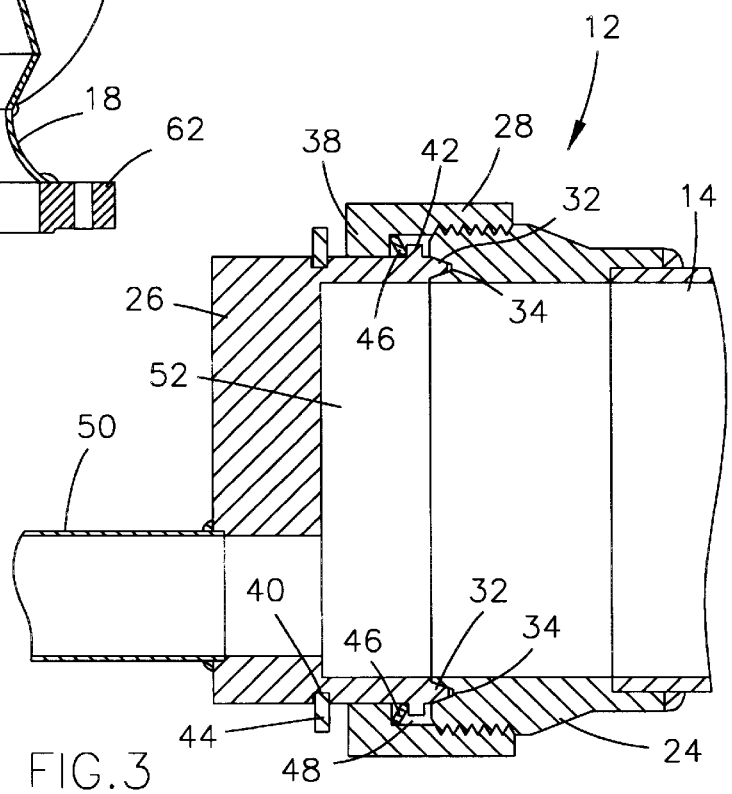
FIG. 3

PIG LAUNCHER/RECEIVER

BACKGROUND OF THE INVENTION

1. Field of the Invention

The present invention generally relates to devices for launching and receiving a body within a pipeline. More particularly, this invention relates to an end coupling for a pipeline through which a "pig" is inserted and removed, wherein the coupling facilitates insertion and removal of the pig and reduces the labor necessary to gain access to the pipeline through the coupling.

2. Description of the Prior Art

Under certain circumstances, a pipeline used to carry fluids must be cleaned or otherwise cleared of residual fluids and/or contaminants in order to avoid contamination of a fluid that will later be carried by the pipeline. There is also the occasion where two different fluids are to be flowed in succession through a single pipeline, necessitating that the fluids be prevented from mixing during transport. On such occasions, a body having an outer diameter closely matching the inner diameter of the pipeline is inserted and then "launched" within the pipeline. The body, referred to in the industry as a "pig," is typically spherical or cylindrical in shape, and is forced through the pipeline by the fluid flowing therethrough. Near the intended destination for the fluid, the pig is "received" in a manner that permits the fluid following the pig to continue downstream through the pipeline and on to its destination. If appropriately shaped and equipped, the pig can perform the function of cleaning debris or various contaminants from the pipeline, clear a pipeline of residual fluids from a previous operation, or separate two fluids flowing simultaneously through the pipeline. Pigs have been adapted for large pipelines, such as those carrying natural gas and oil across long distances, as well as pipelines within a single processing facility or plant.

To insert or remove a pig from a pipeline, coupling joints are required through which access is gained to a section of the pipeline where the pig can be launched or has been received, respectively. A basic approach is to equip the opposite ends of a pipeline with a pair of terminals, referred to as launcher/receivers. Each launcher/received is configured with a recess sized to accommodate the pig, and generally enables the pig to be launched into and received from the fluid flowing through the pipeline near the launcher/receiver. A standard flanged cover serves as a closure through which the pig can be inserted and removed from the launcher/receiver. However, bolts necessary to secure the flange cover to the launcher/receiver require removal and replacement each time a pig is inserted and removed, making the task somewhat labor intensive. Furthermore, if residual pressure remains within the pipeline, the operation can be hazardous to the worker and those nearby. Finally, the pig may not be readily retrievable from the pipeline after the cover is removed, depending on the shape and size of the pig. Accordingly, launcher/receivers equipped with conventional flanged covers must at times be positioned vertically below the pipeline in order gain the assistance of gravity to extract the pig from the pipeline.

Due to the aforementioned shortcomings, the industry has proposed various couplings that facilitate pig launching and receiving. Examples include U.S. Pat. No. 4,073,303 to Foley, Jr., and U.S. Pat. No. 4,237,936 to Lollis et al. Notably, the pig launcher/receivers disclosed by Foley, Jr. and Lollis et al. are configured to relieve residual pressure in a pipeline, thereby promoting operator safety when removing a pig. Each also is configured to simplify the operation of inserting and removing a pig from a pipeline. However, these launcher/receivers require the assistance of gravity to launch and receive pigs through a vertical passage. Furthermore, each of these launcher/receivers has a somewhat complicated construction, and neither is adapted for a pig having other than a spherical shape.

Accordingly, it would be desirable to provide a pig launcher/receiver that is not only able to safely vent residual pressure in a pipeline when used to remove a pig, but also has an uncomplicated construction and operation, facilitates removal of a pig without the assistance of gravity, and is versatile as to the type of pig that can be launched and received.

SUMMARY OF THE INVENTION

It is an object of this invention to provide a device for launching and receiving a body through a pipeline or other conduit.

It is another object of this invention that such a device is configured to be uncomplicated to assemble and operate, and to promote the safety of operating the device.

It is a further object of this invention that such a device can accommodate both bodies of various shapes, including spherical and cylindrical.

In accordance with a preferred embodiment of this invention, these and other objects and advantages are accomplished as follows.

According to the present invention, there is provided a pig launcher/receiver that provides a quick-coupling action when launching and receiving a pig from a pipeline or similar conduit. The pig launcher/receiver generally includes first and second fittings that are coaxially aligned with each other, and a sealing feature for sealing abutting axial ends of the first and second fittings. The first fitting has male threads on an exterior surface thereof. The end of the second fitting opposite the first fitting is closed and forms a cavity within which at least a portion of a pig can be received. The closed end of the second fitting includes a device for venting the cavity between the pig and the closed end. The device is adapted to remove any fluid trapped between the pig and closed end, and thereby allows the pig to be more fully enter the cavity. The pig launcher/receiver further includes a sleeve member circumscribing the second fitting and threadably engaged with the male threads of the first fitting. The sleeve member and second fitting are preferably configured and equipped such that fluid pressure must be released from the pipeline before the sleeve member can be unthreaded from the first fitting. Optional features of the launcher/receiver include a device for retaining a pig in the cavity of the second fitting, and a passage intersecting the first fitting in a manner that facilitates launching and receiving the pig as fluid bypasses the launcher/receiver.

According to the invention, the pig launcher/receiver is coupled to a pipeline by securing the first fitting to an open end of the pipeline, such that the launcher/receiver is a terminus of the pipeline. A pig is inserted in the launcher/receiver by relieving any pressure in the pipeline and then rotating the sleeve member relative to the first fitting. The launcher/receiver is fully disassembled when the sleeve member is completely unthreaded from the first fitting, with the sleeve member preferably being retained on the second fitting. A pig can then be inserted into the first fitting, and the sleeve member and second fitting replaced to again close the pipeline. To remove a pig, fluid flow through the pipeline transports the pig to the launcher/received where at least a portion of the pig is received in the cavity of the second fitting. The cavity between the pig and the closed end of the second fitting is then vented or otherwise drained to eliminate any fluid trapped therebetween and enable the pig to be more fully accommodated in the cavity, e.g., the pig abuts the closed end of the second fitting. The sleeve member is then rotated relative to the first fitting, causing the sleeve member and the second fitting to uncouple from the first fitting. Due to the configuration of the second fitting, the pig is sufficiently received in the second fitting to enable the pig to be extracted from the pipeline without special tools or devices after the second fitting is removed.

From the above, it can be appreciated that inserting and removing a pig from a pipeline with the pig launcher/receiver of this invention can be performed quickly due to the uncomplicated construction and operation of the launcher/receiver. Because the second fitting is adapted to receive at least a portion of the pig, the launcher/receiver can be oriented horizontally without impeding removal of the pig. Furthermore, the launcher/receiver avoids injury to the operator by preventing the removal of the second fitting while the pipeline is under fluid pressure. Finally, the coaxial alignment of the first and second fittings permits pigs of various shapes to be received in the launcher/receiver, thereby greatly increasing the versatility of the launcher/receiver.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawings, in which:

FIG. 1 is a side view in partial cross-section of a pig launcher/receiver in accordance with a preferred embodiment of this invention;

FIG. 2 is a cross-sectional view taken along section line 2—2 through the pig launcher/receiver of FIG. 1; and FIG. 3 is a detailed cross-sectional view of a coupling shown in FIG. 1.

DETAILED DESCRIPTION OF THE PREFERRED EMBODIMENT

A pig launcher/receiver 10 in accordance with this invention is illustrated in FIGS. 1 through 3. As shown in FIG. 1, the launcher/receiver 10 has a generally T-shaped configuration with a coupling 12 at one end of a tubular-shaped passage 14, a flange 16 at the opposite end of the passage 14, and a pipe 18 perpendicular to and intersecting the passage 14. The flange 16 enables the launcher/receiver 10 to be coupled to a pipeline (not shown) of generally any type for which the launcher/receiver 10 would be useful. FIG. 1 also shows a pig 20 received within the tubular-shaped passage 14, trapped between the coupling 12 and a stop rod 22, the latter of which serves as a retainer for the pig 20. The rod 22 is reciprocable so that the pig 20 can be selectively retained and released as circumstances may require.

The coupling 12 generally includes three components: a male fitting 24, a cap 26 and a sleeve 28. The male fitting 24 is preferably secured by soldering, brazing, welding or another suitable joining operation to one end of a tube 30 that forms the passage 14. The male fitting 24 and cap 26 are coaxially aligned, with their inner diameters preferably equal to the inner diameter of the tube 30 to avoid an abrupt change in diameter that could interfere with movement of the pig 20 through the coupling 12 and passage 14. As more readily seen in FIG. 3, the male fitting 24 has an annular recess 32 that is complementary to an annular ridge 34 projecting from one end of the cap 26. The radially inward and outward surfaces of the ridge 34 form a metal-to-metal fluid-tight seal with the recess 32 of the male fitting 24 when the ridge 34 is forcibly engaged with the recess 32 by the sleeve 28, as will be explained. Those skilled in the art will appreciate that various metals could be used for the male fitting 24 and cap 26 and their respective recess 32 and ridge 34. Furthermore, an elastomeric or plastic sealing member (not shown) could be provided between the recess 32 and ridge 34 to promote the fluid-tight seal therebetween.

The sleeve 28 is shown as having female threads engaged with male threads on the male fitting 24. The outer diameter of the sleeve 28 can be appropriately configured to allow tightening and loosening with a wrench or other tool. As shown, the sleeve 28 has an L-shaped cross-section, and serves to secure the cap 26 to the male fitting 24. More specifically, the sleeve 28 has a radially-inward extending flange 38 that circumscribes the cap 26 between a groove 40 and rim 42 formed on the cap 26. The sleeve 28 is retained on the cap 26 by the rim 42 and a snap ring 40 or other suitable retainer in the groove 40. As such, the cap 26 and sleeve 28 are assembled and disassembled together from the male fitting 24 and, therefore, the launcher/receiver 10.

As best seen in FIG. 3, a seal 46 is located within an annular cavity 48 formed when the sleeve 28 is assembled with the cap 26. Preferably, the seal 46 is a metal Belleville-type washer that is capable of sealing the annular joint between the cap 26 and sleeve 28 and prevents the sleeve 28 from rotating on the cap 26 when subjected to fluid pressure. Such circumstances would occur if an operator attempted to remove the cap 26 and sleeve 28 without first releasing pressure in the pipeline. As the ridge 34 on the cap 26 disengages the recess 32 in the male fitting 24, fluid escaping from the pipeline enters the annular cavity 48 and presses the seal 46 into engagement with the outer perimeter of the cap 26 and the inner perimeter of the sleeve 28, thereby preventing rotation of the sleeve 28 relative to the cap 26.

The cap 26 is shown as closing the end of the coupling 12. An inlet/outlet 50 fluidically communicates with the passage 14, and more particularly a cavity 52 within the cap 26. While shown as having an integral diametral wall, the cap 26 could be closed with a plug or other suitable removable or permanent member. As seen from FIG. 1, the inlet/outlet 50 enables fluid trapped between the pig 20 and the cap 26 to be drained, thereby enabling the near end of the pig 20 to contact the closed end of the cap 26. Normally closed, the inlet/outlet 50 is opened to vent or otherwise drain the cavity 52 when a pig 20 is to be removed from the pipeline. The inlet/outlet 50 can also be used to introduce pressurized fluid in order to force the pig 20 away from the cap 26 and into the pipeline.

FIG. 1 also shows the launcher/receiver 10 as including an optional guide rod assembly 54. The guide rod assembly 54 includes a pair of arms 56, one secured to the cap 26 and the other secured to the tube 30. A guide rod 58 is secured between the arms 56 by a pair of nuts 64, and prevents rotation of the cap 26 when the sleeve 28 is being threaded on or off the male fitting 24. Accordingly, the guide rod assembly 54 ensures that the cap 26 and sleeve 28 can be disassembled from the male fitting 24 while maintaining an orientation for the passage 50 necessary for draining the cavity 52.

With reference to FIGS. 1 and 2, the pipe 18 connected perpendicular to the tube 30 is preferably spaced apart from the coupling 12 a sufficient distance so that the entire pig 20 is accommodated between the coupling 12 and the pipe 18, allowing fluid to flow from the passage 14 to the pipe 18 while the pig 20 is retained by the rod 22 and partially received in the coupling 12. As shown in FIG. 2, the passage 14 and pipe 18 are separated by guide bars 60 that support the pig 20 and prevent its misdirection into the pipe 18 as the pig 20 travels through the passage 14 toward the coupling 12, but otherwise allows fluid flow between the passage 14 and pipe 18. The pipe 18 is formed to have a flange 62 to enable its further connection to piping (not shown) that leads to the origin or destination of fluid flowing past the launcher/receiver 10.

In use, the pig launcher/receiver 10 of this invention is connected to a pipeline by securing the flange 16 to an open end of the pipeline, such that the launcher/receiver 10 is a terminus of the pipeline. The pig 20 is inserted in the pipeline through the launcher/receiver 10 by removing the cap 26 and sleeve 28, which entails unthreading the sleeve 28 from the male fitting 24. If the optional guide rod assembly 54 is present, one of the nuts 64 can be removed to allow the cap 26 to move axially away from the male fitting 24 while being prevented from rotating with the sleeve 28. As the sleeve 28 is rotated, any pressure within the passage 14 will cause fluid to vent into the annular cavity 48 between the sleeve 28 and the cap 26 as the annular ridge 34 of the cap 26 disengages the annular recess 32 of the male fitting 24, such that the sleeve 28 cannot be further rotated without first releasing pressure from the pipeline. The launcher/receiver 10 is fully disassembled when the sleeve 28 is completely unthreaded from the male fitting 24, allowing the cap 26 and sleeve 28 to be removed together from the male fitting 24. The pig 20 can then be inserted into the male fitting 24, and the cap 26 and sleeve 28 replaced to again close the pipeline. To launch the pig 20, pressure can be introduced behind the pig 20 through the inlet/outlet 50 to propel the pig 20 into the fluid flowing from the pipe 18 into the passage 14. Alternatively, the launcher/receiver 10 can be configured such that, by retracting the rod 22, the pig 20 is able to be drawn into the passage 14 by fluid flowing from the pipe 18 to the passage 14.

To receive the pig 20, fluid flowing through the pipeline toward the launcher/receiver 10 and pipe 18 transports the pig 20 through the passage 14, over the pipe 18 while supported by the guide bars 60, and into the coupling 12. The cavity 52 between the pig 20 and the closed end of the cap 26 is then vented or otherwise drained through the inlet/outlet 50 to eliminate any fluid trapped therebetween, allowing the pig 20 to take the position shown in FIG. 1. The pig 20 can then be retained with the rod 22 as shown in FIG. 1. If the pig 20 is to be removed from the pipeline, any residual pressure within the pipeline must be relieved before the sleeve 28 can be removed from the male fitting 24, as explained above with respect to inserting and launching the pig 20. Because the pig 20 protrudes from the male fitting 24 and is partially received in the cap 26, the pig 20 is readily extracted from the pipeline without special tools or devices after the cap 26 is removed. Notably, removal of the pig 20 from the launcher/receiver 10 does not rely on gravity for assistance, therefore permitting the launcher/receiver 10 to have the horizontal orientation shown in the Figures.

While the invention has been described in terms of a preferred embodiment, it is apparent that other forms could be adopted by one skilled in the art. For example, the launcher/receiver 10 could be constructed and configured differently from that shown in the Figures and still accomplish the objects of this invention. Furthermore, while a cylindrically-shaped pig 20 is shown with the launcher/receiver 10, the coupling 12 is able to accommodate pigs of various shapes and constructions, including spherical pigs. Accordingly, the scope of the invention is to be limited only by the following claims.

What is claimed is:

1. A pig launcher/receiver comprising:

a first fitting having first and second axial ends, the first fitting having male threads on an exterior surface thereof;

a second fitting having first and second axial ends, the second fitting having a cavity at the second axial end thereof;

means for closing the second axial end of the second fitting;

means for sealing the first axial end of the first fitting with the first axial end of the second fitting;

means for preventing rotation of the sleeve member relative to the second fitting when the preventing means is subjected to fluid pressure from the pig launcher/receiver; and a sleeve member circumscribing the second fitting, the sleeve member having female threads threadably engaged with the male threads of the first fitting.

2. A pig launcher/receiver as recited in claim 1, wherein the closing means comprises a wall integral with the second fitting and means for venting the cavity at the second axial end of the second fitting.

3. A pig launcher/receiver as recited in claim 1, wherein the sealing means comprises complementary annular-shaped features at the first axial ends of the first and second fittings, the complementary annular-shaped features forming a seal when the first axial end of the first fitting engages the first axial end of the second fitting.

4. A pig launcher/receiver as recited in claim 1, wherein the means for preventing relative rotation between the second fitting and the sleeve member comprises an annular cavity between the second fitting and the sleeve member and a sealing member disposed in the annular cavity, wherein fluid pressure entering the annular cavity presses the sealing member into engagement with the second fitting and the sleeve member so as to prevent relative rotation of the sleeve member and the second fitting.

5. A pig launcher/receiver as recited in claim 1, further comprising means for retaining a pig in the cavity of the second fitting.

6. A pig launcher/receiver as recited in claim 1, wherein the first fitting comprises a tubular portion at the second axial end thereof.

7. A pig launcher/receiver as recited in claim 6, further comprising means coupled to the tubular portion for retaining a pig in the cavity of the second fitting.

8. A pig launcher/receiver as recited in claim 6, further comprising:

a passage intersecting the tubular portion so as to be in fluidic communication with the tubular portion; and means within the passage for preventing a pig from entering the passage.

9. A pig launcher/receiver as recited in claim 1, further comprising a pipeline to which the first fitting is secured to yield a liquid-tight joint.

10. A pig launcher/receiver as recited in claim 1, further comprising means for preventing rotation of the second fitting relative to the first fitting.

11. A pig launcher/receiver comprising:

a first fitting having first and second axial ends, male threads on an exterior surface thereof at the first axial end, and a tubular portion at the second axial end;

a second fitting substantially coaxially aligned with the first fitting, the second fitting having first and second axial ends, the second axial end of the second fitting being closed to yield a cavity at the second axial end;

first sealing means located at least one of the first axial ends of the first and second fittings so as to form a seal when the first axial end of the first fitting abuts against the first axial end of the second fitting;

a sleeve member circumscribing and rotatably secured to the second fitting, the sleeve member having female threads threadably engaged with the male threads of the first fitting;

second means for sealing between the second fitting and the sleeve member, the second sealing means preventing rotation of the sleeve member relative to the second fitting when the second sealing means is subjected to fluid pressure from the pig launcher/receiver;

means for draining the cavity at the second axial end of the second fitting;

a passage intersecting the tubular portion of the first fitting so as to be in fluidic communication with the tubular portion; and means within the passage for preventing a pig from entering the passage.

12. A pig launcher/receiver as recited in claim 11, wherein the first sealing means comprises complementary annular-shaped features at the first axial ends of the first and second fittings, one of the complementary annular-shaped features being a ridge and a second of the complementary annular-shaped features being a recess, the complementary annular-shaped features forming the seal when the ridge is received in the recess as a result of the first axial end of the first fitting engaging the first axial end of the second fitting.

13. A pig launcher/receiver as recited in claim 11, further comprising means for retaining a pig in the cavity of the second fitting.

14. A pig launcher/receiver as recited in claim 11, further comprising means coupled to the tubular portion for retaining a pig in the cavity of the second fitting.

15. A pig launcher/receiver as recited in claim 14, wherein the retaining means comprises a shaft reciprocably mounted to the tubular portion.

16. A pig launcher/receiver as recited in claim 11, further comprising a pipeline to which the first fitting is secured to yield a liquid-tight joint.

17. A pig launcher/receiver as recited in claim 16, wherein the first fitting is secured to the pipeline such that the first and second fittings are aligned substantially horizontally.

18. A pig launcher/receiver as recited in claim 11, further comprising means for preventing rotation of the second fitting relative to the first fitting.

19. A pig launcher/receiver as recited in claim 11, wherein the draining means comprises a tubular member in fluidic communication with the cavity in the second fitting.

20. A pig launcher/receiver attached to a pipeline as a terminus thereof, the pig launcher/receiver comprising:

a first fitting having first and second axial ends, male threads on an exterior surface thereof at the first axial end, and a tubular portion at the second axial end, the tubular portion being secured to the pipeline to yield a liquid-tight joint;

a second fitting coaxially and horizontally aligned with the first fitting, the second fitting having first and second axial ends, the second axial end of the second fitting being closed to yield a cavity at the second axial end;

complementary annular-shaped features at the first axial ends of the first and second fittings;

a first annular sealing member on at least one of the complementary annular-shaped features so as to form a seal when the first axial end of the first fitting abuts against the first axial end of the second fitting;

a sleeve member circumscribing and rotatably secured to the second fitting, the sleeve member having female threads threadably engaged with the male threads of the first fitting;

an annular cavity between the sleeve member and the second fitting;

a second annular sealing member disposed in the annular cavity between the second fitting and the sleeve member, the second annular sealing member preventing rotation between the second fitting and the sleeve member when the second annular sealing member is subjected to pressure from the pig launcher/receiver;

means for draining the cavity at the second axial end of the second fitting;

a passage intersecting the tubular portion of the first fitting so as to be in fluidic communication with the tubular portion;

means within the passage for preventing a pig from entering the passage; and means coupled to the tubular portion of the first fitting for retaining a pig in the cavity of the second fitting.

* * * * *